United States Patent
Kershman et al.

(10) Patent No.: US 6,858,241 B1
(45) Date of Patent: Feb. 22, 2005

(54) FARINACEOUS SURFACE PRODUCT THAT IS TOASTER REHEATABLE AND METHOD

(75) Inventors: Alvin Kershman, Ballwin, MO (US); Jeff L. Shear, Chesterfield, MO (US)

(73) Assignee: SMTM Group, LLC., Chesterfield, MO (US)

( * ) Notice: Subject to any disclaimer, the term of this patent is extended or adjusted under 35 U.S.C. 154(b) by 0 days.

(21) Appl. No.: 09/912,219

(22) Filed: Jul. 25, 2001

(51) Int. Cl.⁷ .............................................. A21D 13/00
(52) U.S. Cl. ........................ 426/94; 426/99; 426/275; 426/289; 426/293; 426/302; 426/496; 426/581
(58) Field of Search .................... 426/94, 99, 275, 426/289, 293, 302, 581, 496

(56) References Cited

U.S. PATENT DOCUMENTS

| | | | |
|---|---|---|---|
| 2,060,490 A | | 11/1936 | Borbely |
| 2,378,950 A | | 6/1945 | Reich |
| 3,083,651 A | | 4/1963 | Cooper |
| 3,189,463 A | | 6/1965 | Jones |
| 3,539,354 A | | 11/1970 | Colvin |
| 3,582,350 A | | 6/1971 | Werbin |
| 3,690,898 A | * | 9/1972 | Partyka ...................... 426/275 |
| 3,719,138 A | | 3/1973 | Blaetz |
| 3,767,823 A | * | 10/1973 | Wheeler et al. ............ 426/275 |
| 3,769,035 A | | 10/1973 | Kleiner et al. |
| 3,782,270 A | | 1/1974 | Sollerud |
| 4,015,085 A | | 3/1977 | Woods |
| 4,091,720 A | | 5/1978 | Wheeler |
| 4,207,348 A | | 6/1980 | Vermilyea et al. |
| 4,562,079 A | | 12/1985 | Herzing |
| 4,640,837 A | * | 2/1987 | Coleman et al. ............... 426/94 |
| 4,675,197 A | | 6/1987 | Banner et al. |
| 4,721,622 A | | 1/1988 | Kingham et al. |
| 4,741,908 A | | 5/1988 | Brooks et al. |
| 5,130,150 A | | 7/1992 | Averbach |
| 5,130,151 A | | 7/1992 | Averbach |
| 5,400,698 A | | 3/1995 | Savage |
| 5,401,518 A | | 3/1995 | Adams et al. |
| 5,786,013 A | | 7/1998 | Kloppenburg et al. |
| 5,853,778 A | | 12/1998 | Mayfield |
| 6,013,300 A | | 1/2000 | Reichkitzer et al. |
| 6,139,885 A | * | 10/2000 | Jouanneau et al. ......... 426/275 |
| 6,165,521 A | | 12/2000 | Mayfield |
| 6,210,723 B1 | | 4/2001 | Coleman et al. |
| 6,267,998 B1 | * | 7/2001 | Bauman et al. ............. 426/275 |

FOREIGN PATENT DOCUMENTS

GB    1 411 762    10/1975

OTHER PUBLICATIONS

Hsiao–Ching Chou, Grilled Cheese: Plain and simple, Jul. 11, 2001.*
The Good Cook Snacks & Sandwiches, 1980, pp. 54–55.*

* cited by examiner

*Primary Examiner*—Lien Tran
(74) *Attorney, Agent, or Firm*—Michael Pritzkau

(57) ABSTRACT

A protective coating or film is applied to at least a portion of the outermost surfaces of the outermost layers of a farinaceous product including a high solid fat index lipid or hard butter to form an outer high solid fat index layer. Reheating the product in a toasting environment from a refrigerated or frozen state causes the high solid fat index layer to transfer heat into the interior of the food product by continuously melting and resolidifying in a controlled way to limit toasting while absorbing into the surface of the product at a rate limited by the high solid fat index. The film serves as a protective barrier which limits toasting (i.e., browning) in the toasting environment by conducting heat into the interior of the product and to prevent moisture escape from the product during refrigerated or frozen storage and during the reheating process.

24 Claims, 2 Drawing Sheets

2

FARINACEOUS SURFACE PRODUCT THAT IS TOASTER REHEATABLE AND METHOD

BACKGROUND OF THE INVENTION

The present invention is related generally to the field of food items that are reheatable in a toaster and, more particularly, to a product, that may include a filling, wherein the overall product is well suited for reheating from a refrigerated or frozen state. An associated method is also described.

Food products, which may be prepared by heating in a toaster, have become increasingly popular for reasons including convenience and swift preparation in a fast paced society. Products, which are currently produced and designed for reheating in a toaster, include sliced bread, pancakes, French toast and waffles. With the exception of certain problems to be described, such products can generally be reheated from a frozen state with an acceptable result. Unfortunately, it is submitted that the prior art has addressed these problems in ways that are, at best, only moderately effective and which sometimes produce additional problems including, but not limited to degradation of taste and eating characteristics, as compared to a fresh product, not requiring a toaster for reheating.

It is initially noted that toasters are, in fact, not particularly well suited to the task of reheating products. That is, a toaster is designed to broil items, as opposed to merely reheating them. As an example, one of the major problems with French toast products resides in preserving the desired grilled characteristics of the product. Once the product is initially prepared by grilling, additional browning as the product is reheated in a toasting environment is not desirable and is likely to result in over-browning. Loss of grilled characteristics, as a result of additional browning, is generally a problem with respect to attempting to reheat grilled products in a toaster. Moreover, burning represents another problem wherein the outer surfaces of the item being reheated are burned prior to warming the center of the product. Burning is characteristic of light breads and batters since their very "lightness" serves to inhibit heat penetration, thereby causing burning as a result of heat accumulation at the surface. The problem is further aggravated with increasing product thickness or fillings since longer heating times are needed to warm the product interior.

The latter problem is of particular concern with respect to filled products and is of even more concern in the case of reheating a frozen filled product. Also, in an upright toaster, fillings are of concern with regard to leaking out of an encapsulating material such as a sandwich. Oily or fatty fillings further represent a fire hazard in the event of leakage coming into contact with the heating grid surface in the toaster. The prior art, in attempting to provide fillings in toaster reheatable products, has resorted to a low moisture pastry surrounding a relatively small amount of low moisture filling. The low moisture filling is generally resistant to leaking from the pastry shell.

To cope with the concern of sufficiently heating the filling while avoiding burning of the surrounding shell, prior art toaster reheatable products, especially frozen products, are generally thin, for example, on the order of one-half inch or less. Non-grilled products are designed to resist burning due to an outer crust that includes a high fat content or is fat soaked, which is also intended to allow for sufficient heating of the interior prior to product burning. In certain cases, products are pre-fried to insure sufficient fat levels to expedite the reheating process. That is, a sufficient amount of fat permeating the crust serves as an expedient in heat conduction to the filling material. Unfortunately, soaking the outer extents of a grilled product with fat sufficient to conduct heat in this manner results in a soggy, unpalatable product. That is, the organoleptic characteristics of the grilled product are, for practical purposes, completely destroyed by this attempt to achieve toaster compatibility.

Grilled products can be reheated in a microwave; however, the microwave dramatically changes the eating characteristics of the bread as well as the texture of the grilled surface. During microwave reheating the grilled product tends to develop a soggy surface in place of its original crisp surface, compromising its taste and eating characteristics. One solution seen in the prior art resides in the use of a metallized sleeve during microwaving. While the sleeve can help restore some of the grilled characteristics to the surface when microwaving, the results are unlike a freshly made grilled product.

The present invention provides a highly advantageous coating and associated method, which is capable of producing a wide array of products, including grilled products, to resolve the foregoing problems and concerns while providing still further advantages.

SUMMARY OF THE INVENTION

A food product and associated method are disclosed. The product includes an outermost farinaceous layer defining one or more outermost surfaces. A protective coating or film is applied to at least a portion of the outermost surfaces of the outermost layer. The coating film comprises a high solid fat index lipid or hard butter mixture to form an outer high solid fat index layer on each outermost surface.

In one aspect of the invention, the product is suitable for toaster reheating directly from a refrigerated or frozen state. At least initially upon reheating the product in a toasting environment, the high solid fat index layer transfers heat into the interior of the food product by continuously melting and resolidifying in a controlled way to limit toasting of the outermost major surfaces while absorbing into the surface of the product at a rate limited by the high solid fat index. Thus, the coating film serves as a protective barrier, which limits toasting (i.e., browning) in the toasting environment by conducting heat into the interior of the product.

In another aspect of the invention, the coating film further serves to prevent moisture escape from the product during refrigerated or frozen storage and during the reheating process.

In still another aspect of the invention, using the protective film of the present invention, products may be produced having generous proportions of fillings positioned between bread layers. Even such generous filling proportions are generally reheatable from the frozen state due to the heat conduction provided by the protective coating film of the present invention. In one feature, the thickness of the coating film may be increased proportionally for products, which exhibit characteristics causing them to be more difficult to reheat, and/or for products that are proportionally thicker.

In yet another aspect of the invention, a sealing bead is applied in the production of a sandwich having a pair of bread slices so as to surround a filling positioned between the bread slices in a way which bonds the bread slices to one another whereby to avoid the filling from escaping from between the bread slices. This feature is particularly advantageous in the use of fatty fillings such as, for example, cheese, which melts during reheating. The seal, once grilled, is substantially indistinguishable from the bread slices themselves.

In another aspect of the present invention, the coating mixture includes additional solids. Particles may be provided as at least a portion of these solids so as to provide a particular appearance of the coated surfaces of the product after application of the coating mixture. In one feature, the particles may be formed from the same material as that which forms the outermost layers of the product. For example, where bread is used to make a sandwich, that same bread may be toasted to create crumbs having the desired color characteristics for addition to the coating mixture. In this manner, the presence of the coating mixture is rendered at least somewhat invisible.

In another aspect of the present invention, the food product is produced having a peripheral edge, which is configured in a way that is intended to limit burning of the peripheral edge during reheating. In one implementation, the edge may include a tapered configuration.

BRIEF DESCRIPTION OF THE DRAWINGS

The present invention may be understood by reference to the following detailed description taken in conjunction with the drawings briefly described below.

DETAILED DESCRIPTION OF THE INVENTION

Figure 1:
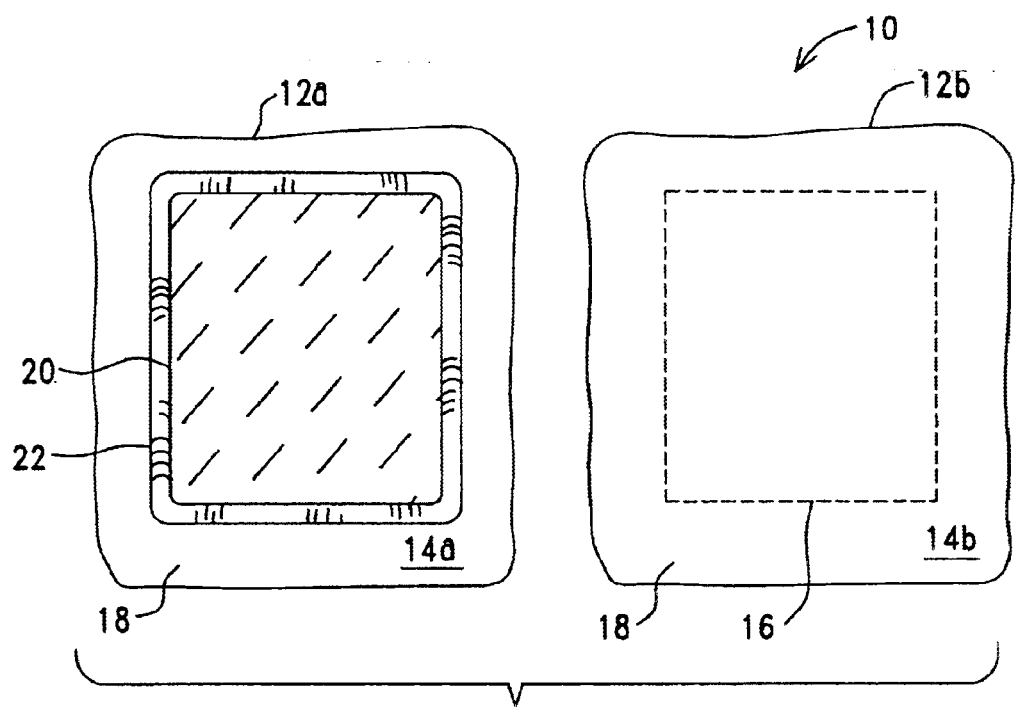
FIG. 1 is a diagrammatic plan view illustrating the preparation of a cheese filled sandwich in accordance with the present invention showing the use of a farinaceous sealant.

Turning now to the drawings, wherein like items are indicated by like reference numbers throughout the various figures, attention is immediately directed to FIG. 1, which illustrates an initial step for producing a grilled product in accordance with the method of the present invention. In the present example, a grilled cheese sandwich 10 (laid open in FIG. 1) is produced. It is to be understood that the method of the present invention is well suited to a wide range of grilled products including, but not limited to grilled cheese. The choice of production of a grilled cheese sandwich in the present example is made for illustrative clarity and is in no way intended to be limiting.

Still referring to FIG. 1, the method begins with two slices of pre-baked and pre-sliced bread; a bottom slice and a top slice indicated by the reference numbers 12a and 12b, respectively. Useful bread slice length and width can range in size from 3 to 5 inches high by 3 to 5 inches or greater. Bread thickness can range from 3/16 inch to 1/2 inch or more per slice. One preferred size is approximately 3¾ inches by 3½ inches and 5/16 inch thickness per slice. Total sandwich length, width and thickness are influenced by the size of the standard toaster, particularly the slot width. Further considering thickness, a standard toaster includes an opening of approximately 1 inch in width. Toasters configured to accommodate bagels allow for thicker sandwiches, up to approximately 1 inch thick per product. In addition, the use of Pullman style bread, having somewhat straight edges once sliced, is preferred to slices obtained from a bread loaf having a domed top.

Before applying filling materials, approximately 1 to 2 gm of butter (not shown) is applied to both of the exposed inner major surfaces 14a and 14b of the slices. The application area is the same for both slices, intended to coincide with an area to be covered by a portion of filling materials in a subsequent step, but is illustrated for only for surface 14b as being within a dashed line 16. The butter is applied evenly, leaving a surrounding 1/2 to 3/4 inch unbuttered region 18 around the buttered areas. One preferred amount of butter is 1 gm, leaving approximately a 3/4 inch surrounding width of unbuttered edge portion. Alternatives to butter include, but are not limited to various mayonnaise substitutes.

With continuing reference to FIG. 1, a slice of American cheese 20 is positioned on surface 14a. Although American cheese is described in the present example, it is to be understood that other types of cheese and/or fillings may be utilized. These alternatives include, for example, Swiss cheese, ham, bacon, egg or any other suitable filling. The amount of filling may vary from 16 gm to 44 gm or more. In the instance of sliced cheese filling, however, the cheese slices should extend outwardly beyond buttered area 16 by at least 1/8 inch, while simultaneously leaving an exposed width of unbuttered region 18 of at least 3/8 inch for reasons to be described below.

After applying the filling material, a sealant 22 comprising approximately 46% flour and 54% water is applied to a portion of unbuttered region 18 on surface 14a surrounding cheese 20. Extension of the cheese filling beyond buttered outside the buttered area within dashed line 16 insures placement of the sealant on an unbuttered surface for proper bonding of the slices. Sealant 22, in a paste form, may be extruded as a continuous bead, approximately 1/8 inch wide. Depending on the overall size of the sandwich, the applied bead exhibits a weight of approximately 5 to 10 gm. Based on a preferred sandwich size of 3¾ by 3½ inches by 3/8 inch thick, the weight of the bead is approximately 8 gm. This sealant paste may be produced, for example, by combining water or water based fluids with various flours, starch or other gelling agents. Thereafter, sandwich 10 is closed by placing slice 12b on top of slice 12a such that surfaces 14a and 14b are in a confronting relationship with filling (cheese 20) therebetween.

Upon closing the sandwich, slight pressure, on the order of for example approximately one pound per square inch or less, should be applied to insure that the bead of sealant 22 contacts and is spread against both of bread surfaces 14a and 14b so as to at least slightly penetrate into the bread slices. Of course, this penetration is enhanced due to porosity of the bread slices themselves. Again, proper bonding of the bread slices is achieved by avoiding placement of the sealant on the buttered region. In this manner, a highly advantageous seal is achieved, as will be further described.

Prior to a grilling process, the outwardly facing major surfaces of sandwich 10 are sprayed (not shown) with a butter-flavored oil at a rate of approximately 0.02 to 0.06 gm per square inch. A preferred spray level is approximately 0.04 gm per square inch. This application provides for achieving a desired grilled appearance and eating characteristic of the sandwich upon subsequent grilling. Of course, this oil may be applied in any suitable manner. While butter flavored oil is preferred on a grilled cheese sandwich, it may not be appropriate for other types of grilled products. It is noted that this step can be eliminated by oiling the grilled surface to be used. At the same time, however, it should be appreciated that the flavored spray may add additional benefits when placed on the bread first such as, for example, greater flavor impact.

Figure 2:
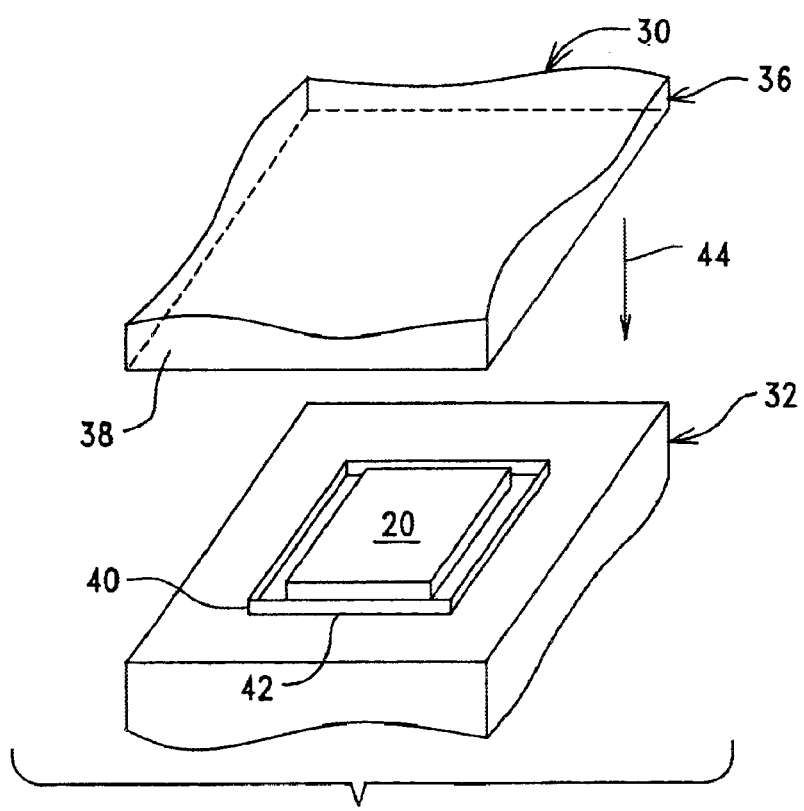
FIG. 2 is a diagrammatic perspective view of a cooking apparatus for grilling the sandwich prepared in FIG. 1.

Referring now to FIG. 2, a grilling apparatus 30 is provided including a lower grill assembly 32 having a lower grill surface (lower platen) 34 and an upper grill assembly 36 having an upper grill surface (upper platen) 38. Sandwich 10 is positioned on lower grill surface 34 preparatory to grilling. Preferably, pressure applied to the sandwich during grilling is controlled in a way, which enhances characteristics of the sandwich. That is, too much pressure may. result in a sandwich that is unacceptably thin. Worse yet, too much pressure may adversely affect characteristics of sealant 22. For example, excessive penetration of the sealant into the bread slices may reduce the ability of the sealant to bond the slices together following grilling. Alternatively, too little pressure may result in most of the sealant being disposed between the slices with insufficient penetration into the slices to bond them to one another; again resulting in separation of the slices after grilling.

One useful technique, in this regard, has been found to place a guide bar 40 formed, for example, from stainless steel around sandwich 10. Guide bar 40 includes a peripheral wall 42 having a predetermined height based on factors including a pre-grilled thickness of sandwich 10. In this regard, it should also be noted that cheese or other fillings in the sandwich need not have a particular influence on grilled thickness of the sandwich when guide bar 40 is used. It has been found that the bread disposed between the filing and the grill surfaces compresses to an additional extent which allows the surrounding edge portions of each slice of bread to still receive sufficient compressive force from the grill surfaces to optimally bias the edge portions against one another thereby enhancing bonding of the edge portions of the slices to one another using sealant 22 (see FIG. 1). The grill assemblies may be resiliently biased toward one another or the weight of the upper grill assembly may be sufficient to compress the sandwich sufficiently to cause the upper grill surface to contact and rest upon guide bar 40.

With sandwich 10 positioned on lower grill surface 34, a grilling step is performed in which the upper grill assembly is moved in a direction indicated by an arrow 44 to be placed against guide bar 40 such that the height of the guide bar establishes a grilling separation distance between the upper and lower grill surface. Preferably, the upper and lower grill assemblies are preheated. The grill temperature may be varied, for example, from approximately 300° to greater than 350° F. depending on the type of grilled product and the grilling effect intended. The grill assembly is held closed for a period of 30 to 90 seconds, depending on the grill temperature and the required grilling characteristics. A preferred grilling temperature of 350° is based on a sandwich of approximately 3¾ by 3½ by ½ after grilling. Grilling is completed upon achieving desired appearance and eating characteristics of the particular grilled product. Of course, this process is readily adapted to commercial production line equipment.

In one alternative, a single heated surface grill can be utilized to grill one major surface of the product at a time. At the same time, slight compression of the sandwich to insure uniform height, for example, consistent with the compression provided by the grilling apparatus described above, should be applied. This compression may even be applied manually, for instance, using a spatula arrangement positioned across guide bar 40. Accordingly, the product described above may be grilled on each side for approximately 45 seconds. In any case, the total grilling time may be adjusted to provide an effect that is equivalent effect to the effect accomplished in the dual surface grilling apparatus. Still further alternate methods are contemplated to insure uniform height and insure proper compression of the edges with the sealant in between. For example, sizing rolls may be used. In the prior art, a variety of single-sided continuous grilling equipment is currently used to produce products such as French toast and pancakes. This equipment often utilizes automatic flipper arrangements to flip the product over at an appropriate time. In view of the foregoing discussion, it is considered that the present invention is readily adapted for use with such equipment with little modification.

Once the grilling operation is complete, the product is allowed to cool to a suitable surface temperature depending upon the characteristics of the applied coating. Thereafter, in accordance, with the present invention, a coating mixture is applied at least to the major surfaces of the product. The resulting coating is intended to be relatively thin, generally less than $1/16^{th}$ of an inch. The coating mixture is based on a lipid having a high solid fat index (SFI) at a is temperature of 90° to 100° F. or higher. The applied coating tends to set up quite rapidly on the cooled product when the latter is below the melting temperature of the coating. As will be further described, other materials may be dispersed in the high SFI coating mixture serving, in part, to cause the coating to set up even more rapidly. Even in the absence of additional ingredients, it has been found that the coating sets up rapidly with minimal absorption into the surface. This characteristic is particularly important inasmuch as a coating that soaks significantly into the surface of a grilled bread product readily imparts a soggy grease-soaked characteristic which many consumers find unappealing. The high SFI coating of the present invention resolves this problem by rapidly setting up upon application. Moreover, as will be seen, the high SFI coating of the present invention imparts remarkable re-heating characteristics when used on a product in a toasting or similar environment.

Attention is now directed to the formulation of the high SFI coating mixture of the present invention. The primary ingredient in the coating mixture of the present invention is a high solid fat index lipid or hard butter. As an alternative, combinations of various high solid fat index hard butters or fats may be used. The term high solid fat index applies to a lipid-based material wherein a large proportion of solid (i.e., non-liquid) fat remains present almost to a specified melting temperature or point. Once that melting temperature is reached, the solid fat converts rapidly to liquid form. Melting may be so rapid as to give an appearance that the entirety of the solid fat almost instantaneously transforms to the liquid state. Conversely, the material transforms from the liquid to solid state, upon cooling, in an opposite manner. That is, the material, initially primarily in liquid form, appears to transform almost instantaneously to the solid state. Again, this characteristic provides for little penetration of the coating mixture into a bread surface upon initial application, so long as the application surface is at least slightly below the melting or "transformation" temperature of the high SFI material. Characteristics of one suitable hard butter are given by Table 1.

TABLE 1

Hard Butter Characteristics

| Temperature | Solid Fat Content |
|---|---|
| 50° F. | 60–90% |
| 70° F. | 60–90% |
| 80° F. | 30–80% |
| 92° F. | 5–80% |
| 100° F. | 5–70% |
| 110° F. | 0–40% |
| 120° F. | 0–20% |
| 140° F. | 0–5% |

It should be appreciated that Table 1 is representative of only one suitable lipid material and that other suitable materials may vary somewhat from this characteristic. An appropriate material may be selected, for example, based on end characteristics of the desired product including, but not limited to fractionated butter oil. What is more important to note with regard to the depicted characteristic resides in the rapid decrease in solid fat content in a narrow change of temperature from 80° F. to 92° F.

As mentioned, the coating mixture of the present invention may include additional ingredients. One appropriate formulation is given by Table 2 with the percentages given by weight.

TABLE 2

Coating Mixture Formulation

| Melted "Hard Butter" | 60–80% |
|---|---|
| Maltodextrin | 2–10% |
| Toasted Fine Bread Crumbs | 5–25% |

The hard butter is initially melted. Thereafter, the ingredients are thoroughly mixed to form a suspension of solid particles or solids in the melted hard butter. During this step, the hard butter temperature may be maintained in a suitable range depending on the characteristics of the hard butter utilized, and relative to the specific application method. In order to insure a uniform mixture, the mixing temperature should be held at least above the melting temperature of the particular hard butter that is being used. The maltodextrin serves to maintain moisture slow hard butter absorption, enhance flavor and provide uniform color. The toasted bread crumbs are useful for several different reasons. First, the toasted bread crumbs are selected to improve the appearance of the product to which the coating mixture is to be applied. That is, even a relatively thin coating of hard butter, by itself on a grilled product is generally characterized by a somewhat opaque appearance, which may be unappealing to a consumer. The presence of the toasted bread crumbs serves to match the appearance of the coating mixture to the desired appearance of a particular grilled surface, rendering the coating mixture somewhat invisible after application. In addition, the bread crumbs provide a texture, which is more akin to the surface of the bread prior to receiving the coating. Particles of the same material (for example, bread and pancakes) that is being prepared may be used to produce crumbs. Such particles may be toasted or prepared in any suitable way to enhance the appearance of the coated product, as desired For example, the crumbs may range from finely ground to coarse to achieve a particular effect. Additional ingredients may be added such as, for example, various sugars, flavoring and appropriate processing aids such as baking soda) to achieve appearance objectives and enhance moisture and flavor. Of course, alternative particles may be used to entirely change the appearance of the product, via the coating mixture, in view of some intended appearance of the product to which the coating mixture is to be applied. For example, Saint Patrick's green grilled cheese sandwiches and numerous holiday related decorative scenarios. The additional particles are also advantageous for a second reason; specifically, in serving to promote setting of the coating mixture once it has been applied to the product.

Figure 3:
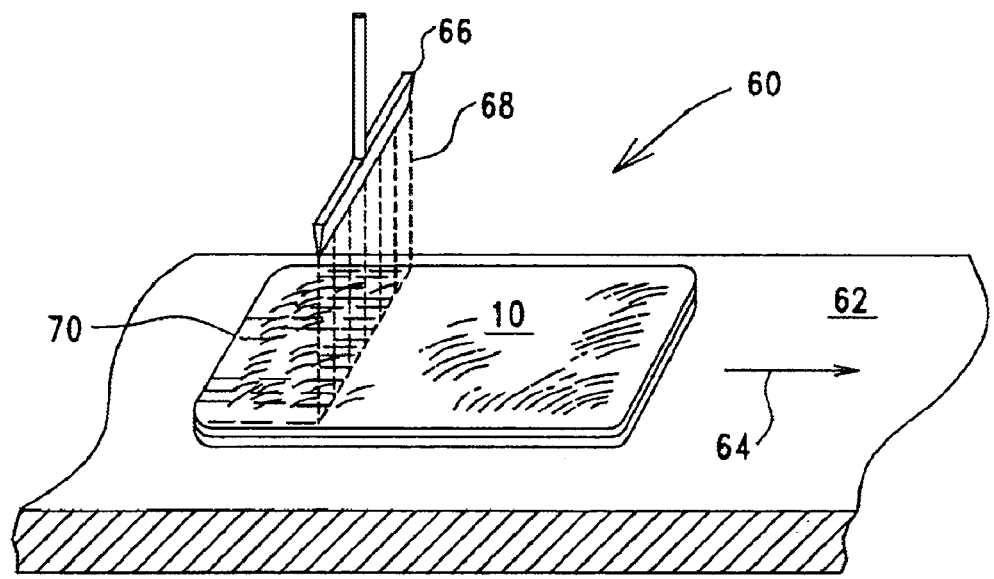
FIG. 3 is a diagrammatic perspective view of one production process for applying a protective film of the present invention to the sandwich produced by the apparatus of FIG. 2 which production process is adaptable to a wide range of other suited products.

Turning to FIG. 3, application of the coating mixture to products such as, for example, grilled sandwich 10 of FIG. 2 will now be described. FIG. 3 illustrates an enrobing arrangement generally indicated by the reference number 60. Enrobing arrangement 60 includes a conveyor 62 which carries sandwich 10 in a direction indicated by an arrow 64. An enrobing nozzle 66 releases a curtain 68 of melted coating mixture so as fall upon passing sandwich 10. The rate of movement of conveyor 62 and the flow rate of the coating mixture from nozzle 66 cooperate to apply a layer 70 of the coating mixture of the present invention to the upwardly facing surface of sandwich 10. After allowing layer 70 to set, sandwich 10 may be flipped using a mechanism (not shown) such as the flipping mechanisms currently known in the art. Conveyor 62 may then be routed beneath a second nozzle (not shown), which is similar to nozzle 66, so as to similarly apply a layer of coating mixture to the opposite major surface of sandwich 10. The amount of protective coating mixture applied as a layer to both sides of the sandwich may equate to approximately 0.2 to 0.3 gm per square inch of mixture per each exposed major surface. Thickness of coating mixture layer 70 may range from approximately 0.0041 inch to 0.039 inch. It has been found to be unnecessary to coat the sides of a sandwich, so long as the major surfaces are coated substantially to their edges (considering uniform heat exposure), since the sides are not generally not exposed to direct heat from toaster heating elements during toaster reheating.

In continuous processes typical of commercial production, it should be appreciated that the coating mixture of the present invention may be applied to products by enrobing, as described above, or by any number of alternative methods or combinations thereof which have not been illustrated since they are known in the art. For example, a spreader blade may be utilized in the application of the coating mixture. As another example, doctoring rolls may be used. Accordingly, a pair of rolls comprising an upper roll and a lower roll each rotate in a way which picks up or receives a layer of coating mixture on the surfaces of the rolls. Sandwich 10 then passes between the rolls so as to simultaneously receive the layer of coating mixture on both major surfaces. As another example, a third application method resides in a spraying system that applies the proper amount of coating to both sides of the product. It may be desired to flip the product so as to spray one major surface at a time at a pair of spraying stations. In this regard, the particle size of ingredients present in the coating mixture, such as the aforementioned toasted bread crumbs, should be considered so that spray or enrobing nozzles are not clogged by the particles. As still another example, a curtain of coating mixture may be applied to the upper surface of the product and the lower surface may be coated, for example, by passing through a bath.

Figure 4:
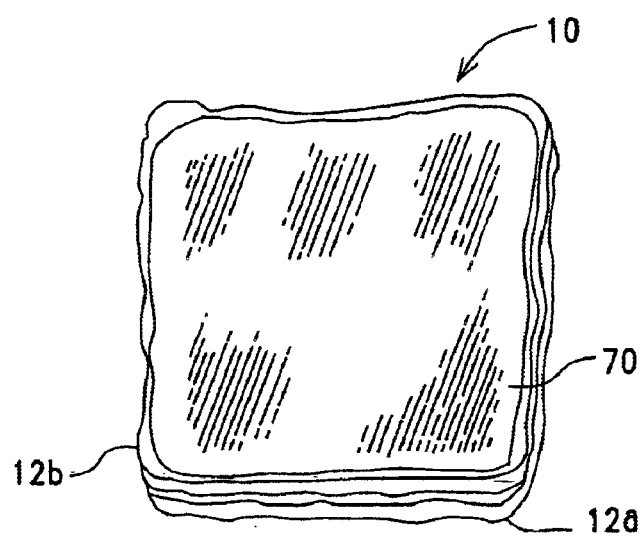
FIG. 4 is a diagrammatic view, in perspective, of a cheese filled sandwich including the protective film of the present invention.

Referring to FIG. 4, sandwich 10 is illustrated after application of coating mixture layer 70 of the present invention. Irrespective of the manner of application of the coating mixture, relatively rapid setting of the coating mixture in room temperature air facilitates prompt packaging of the product. As one advantage of the coated product of the present invention, once the coating layer has solidified (which may take several minutes in cool air) the products may be packaged without the need for protective packaging layers between each individual product. Product packaging may be done individually per pouch, or by placing several products layered together within a larger package. Once packaged, the packaged product is frozen for storage prior to retail sale and thereafter frozen stored at the consumer's location. Frozen storage is not a requirement since products produced according to this disclosure may even more readily be reheated from a refrigerated or room temperature state.

Having described the method of application of the present invention and products produced thereby, it is now appropriate to discuss its associated advantages. For purposes of clarity, these advantages will be described with regard to grilled cheese sandwich 10. Even when the latter is stored frozen, it has been found that the sandwich optimally and fully reheats in a toaster at "medium-high to "high" settings. Moreover, the state of the sandwich after toaster reheating appears to be virtually unchanged as compared to the state of the sandwich when fresh, immediately after grilling. Of course, maintaining the "just-grilled" state requires reasonably prompt and sufficiently cold frozen storage, for example, if stored at approximately 0° F. Reheating is generally accomplished in one toaster cycle from the fully frozen state, once the appropriate toaster setting is established. Remarkably, the reheated sandwich exhibits no significant burning, yet the cheese filling warms and even melts (even a generous portion weighing 30 grams or more) to an extent that provides for eating characteristics that are associated with a freshly made grilled cheese sandwich. During comparative testing, an equivalent sandwich was reheated without the application of the coating mixture of the present invention and in the same toasting environment. The major surfaces of the "untreated" sandwich experienced burning to an extent which rendered the sandwich inedible, yet at least a portion of the cheese filling remained cold or frozen at its center. The remarkable difference in these results is attributed to the presence of the coating layer of the present invention and its heretofore unrecognized properties in the present application, as will be further described.

The highly advantageous resistance to burning that is imparted by the coating mixture of the present invention is thought to relate to the melting point of the hard butter in conjunction with its high solid fat index. The coating mixture layer serves as a protective film, which conducts heat to the interior of the product in a highly advantageous way. Specifically, the toasting environment is hot enough to melt the protective film yet the product, for at least a majority of the reheating process, is at a temperature that is below the melting point of the protective film. Accordingly, when the melted protective film begins to penetrate the product outer layer, it immediately resolidifies For this reason, the coating layer remains essentially intact, functioning at least through the reheating process and absorbing slowly into the outer product surface. At the same time, the coating mixture layer serves to conduct heat into the interior of the product in a rapid manner while further serving as a moisture barrier to prevent the escape of moisture from the interior of the product. This heat conduction capability prevents heat accumulation proximate to the surface of the product so as to limit or avoid burning. Moreover, the heat conduction property is aided by the coating layer eliminating insulating air pockets at the surface of the product. A systematic reheating process is thereby provided. Upon completion of reheating, penetration of the protective coating mixture layer is sufficient so as to cause any remaining protective film to be unnoticeable.

Consistent with the foregoing paragraph, products which have fillings that are difficult to reheat or are quite thick, requiring a longer reheating time period, may receive a coating layer having a hard butter with a relatively higher melting temperature further enhancing heat penetration to avoid burning. In theory, the thicker the product, the higher the melting point of the hard butter. At some point, however, the melting point of the hard butter becomes too high, which will limit absorption into the surface of the product as well as limiting melting. The result may inhibit the reheating process as well as producing a waxy mouth feel upon consumption of the product. Therefore, the melting point should be adjusted to accommodate these constraints. One useful melting temperature, however, has been found to be approximately 110° F.

It is important to understand that, while the invention is described in the context of producing a grilled cheese sandwich, utilizing white bread, the invention is equally applicable to numerous types of sandwiches containing, for example, meat, cheese, vegetables, sauces, and eggs; combinations of such ingredients and others are also contemplated. The major limiting factor, in this regard, relates to the total thickness of the sandwich as well as the thickness of the various ingredients within the sandwich. As an example of combined ingredients, meat will reheat quickly when in the presence of melting cheese. Meat without cheese or sauce tends to heat less quickly and should be used in the form of thin slices, though layering meat between some type of sauce may prove effective for reheating purposes. Whatever filling is used, the present invention provides for reheating a generous portion of filling from even the frozen state.

With regard to fillings in a sandwich product, the use of farinaceous paste for sealing the filling materials, particularly runny or meltable materials, is considered as being highly advantageous, in and by itself. This sealant is seen to completely resolve difficulties presented with fatty fillings in generous portions, which will readily run out from between an unsealed pair of bread slices in sandwich form. When formed according to the teachings above, bread slices seal together so well using the farinaceous paste that the bread generally tears prior to the bond breaking, even when one deliberately attempts to break the sealing bond. The problem faced by the prior art, in this regard, should not be underestimated since such fatty fillings may readily catch on fire in a toasting environment.

The type of bread accommodated by the present invention may run the full range of normal bread varieties that are appropriate to grilling including, but not limited to: whole wheat, pumpernickel, rye and sour dough.

The present invention is equally applicable for use in producing a range of products for stable toaster reheating. In addition to applying the protective coating to grilled sandwiches, the coating may also be applied in a similar manner to grilled pancakes, waffles, French toast, dipped bread (French toast), dipped sandwiches and any other appropriate product. The latter is considered to be any prepared product intended for toaster reheating. Such products may be stored frozen or refrigerated. The addition of the coating of the present invention insures proper reconstitution in a toaster, resulting in a product that appears as if it was just freshly prepared, having the appropriate flavor, odor and mouth feel of its fresh state, as is exemplified by excellent characteristics achieved with a grilled cheese sandwich. The coating layer serves in the same manner on other product types, promoting rapid reheating while essentially eliminating burning. That is, the product's intended characteristics, both appearance and organoleptic, closely approach and may be essentially indistinguishable from the freshly prepared product. Moreover, prior art products, incorporating fillings or unfilled, may be optimized using the coating layer of the present invention to allow for the production of thicker French toast, higher quality pancakes, exotic waffle formulations and, in general, higher quality products than those currently available for toaster reheating. This optimization and the use of the coating layer, in general, allows for the use of grilled sandwiches and other products that do not require formulation modification in the bread or filling to produce a highly satisfactory toaster stable product. Therefore, commercial bread, cheese, and meats, among others, remain useful without special modification. Farinaceous materials suitable for use in the present invention include, but are not limited to wheat, corn, rye, barley, soybean and potato flours along with combinations thereof. Breads suitable for use in the present invention include leavened and unleavened breads. One example of the latter is a tortilla.

The protective film of the present invention is also advantageous with regard to avoiding product moisture loss since it is generally immune to water penetration. Moreover, considering a refrigerated product, the coating mixture layer of the present invention is not subject to rapid breakdown or physical change in the refrigerated (or frozen) environment and almost certainly demonstrates greater shelf stability than its supporting product. Hence, the applied film serves to improve the shelf stability of any product coated, functioning as a significant moisture barrier whereby to minimize drying out and staling.

As one alternative to hard butter in the protective coating of the present invention, the use of a "thickened fat" is contemplated. Such a thickened fat may be produced using materials such as, for example, silicon dioxide, which serves to gel the fat Thickening in this manner serves to increase heat penetration into the product interior during reheating, but also limits absorption of the fat into a product since the fat stays in its thickened state. Moreover, thickened fat is significantly opaque as compared to a thin film containing hard butter, producing product appearance concerns. At the same time, the reduced absorption of the thickened fat tends to leave an excessive fat coating on the surface of the product which may perceived as unpalatable by consumers. The use of a hard butter is considered to be highly advantageous since only a thin film application is required, and subsequent systematic penetration into the product enhances product-eating characteristics.

Figure 5:
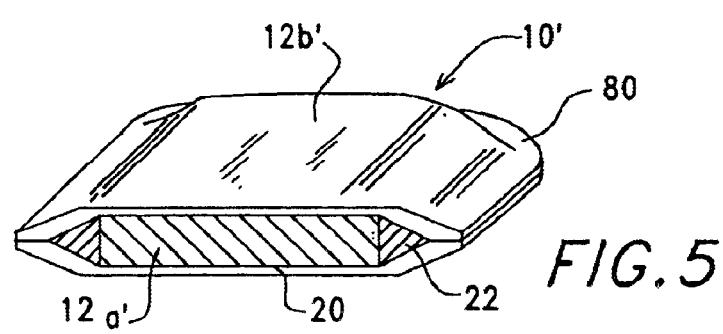
FIG. 5 is a diagrammatic perspective view of another sandwich, in cross-section, shown here to illustrate a tapered peripheral edge configuration of the sandwich.

Referring now to FIG. 5, another grilled cheese sandwich produced in accordance with the present invention is shown in cross-section generally indicated by the reference number 10'. Sandwich 10' includes bread slices 12a' and 12b' having cheese slice 20 positioned therebetween. A crust has not been illustrated on the bread slices for purposes of clarity. Sandwich 10' includes an advantageous tapered peripheral edge configuration 80 which serves to avoid excessive browning or burning of the edges. This feature is particularly advantageous in the instance where the outward facing edges of the bread slices are not coated with the coating mixture of the present invention. Tapered peripheral edge configuration 80 is further advantageous when used in conjunction with thicker sandwiches or where fillings are used that are more difficult to reheat by reason, for example, of their thickness or inherent thermal properties. The tapered peripheral edge configuration may be produced, for example, using a two-piece mold during grilling having an appropriate configuration, which compresses the edges of the sandwich into the desired tapered configuration as the sandwich is grilled. In this way, the tapered configuration is maintained after completion of grilling. It is considered that such a mold may be produced by one having ordinary skill in the art in view of this overall disclosure.

In addition to toaster or oven reheating, products produced in accordance with the present invention may be reheated in a microwave oven; as is the case with all products, however, the microwave may dramatically change the eating characteristics of the bread as well as the texture of the grilled surface. A metallic sleeve may be employed to maintain desired characteristics of the product with microwaving.

One skilled in the art may devise many alternative configurations for the arrangements, products and methods disclosed herein. Therefore, it should be understood that the present invention may be embodied in many other specific forms without departing from the spirit or scope of the invention and that the present examples and methods are to be considered as illustrative and not restrictive, and the invention is not to be limited to the details given herein, but may be modified within the scope of the appended claims.

What is claimed is:

1. In producing a reheatable food product, a method comprising:

assembling said food product to include an outermost farinaceous layer defining one or more outermost surfaces and which outermost farinaceous layer surrounds a filling;

grilling the food product such that the filling is heated;

coating at least a portion of the outermost surfaces with a high solid fat index lipid mixture to form a high solid fat index layer on said portion of the outermost surfaces wherein said lipid mixture comprises hard butter, maltodextrin and additional solids dispersed in the lipid mixture;

cooling the food product at least sufficient to solidify said high solid fat index layer;

freezing the food product into a frozen state after said grilling; coating and cooling; and reheating the reheatable product in a toasting environment to cause the high solid fat index layer to transfer heat into the interior of the food product.

2. The method of claim 1 wherein said outermost farinaceous layer includes at least one of wheat, corn, rye, soy bean and potato flour for receiving said coating.

3. The method of claim 1 wherein said high solid fat index lipid is applied to form said outer high solid fat index layer having a thickness in the range of approximately 0.0041 inch to 0.039 inch.

4. The method of claim 1 wherein said high solid fat index lipid is formulated to include a solid fat index characterized as

SFI @ 50° F. 60–90%,

SFI @ 70° F. 60–90%,

SFI @ 80° F. 30–80%,

SFI @ 92° F. 5–80%,

SFI @ 100° F. 5–70%,

SFI @ 110° F. 0–40%,

SFI @ 120° F. 0–20%,

SFI @ 140° F. 0–5%.

5. The method of claim 3 wherein said high solid fat index layer is approximately 1/32 inch thick.

6. The method of claim 1 including the step of dimensioning said food product for reheating in an upright consumer toaster.

7. The method of claim 1 wherein said coating is applied at a rate of approximately 0.2 to 0.3 grams per square inch.

8. The method of claim 1 wherein said high solid fat index lipid include a melting point and said method, prior to said coating step, further comprising the step of:

cooling the food product after grilling such that said outermost surfaces are at a temperature below said melting point.

9. The method of claim 1 including the step of performing said coating step by enrobing.

10. The method of claim 1 including the step of performing said coating step by spraying.

11. The method of claim 1 wherein said food product includes a product thickness and said coating step is performed to apply said outer high solid fat index layer at a coating thickness that is based, at least in part, on said product thickness.

12. The method of claim 11 further comprising the step of increasing said coating thickness with relative increases in said product thickness.

13. The method of claim 1 further comprising the steps of:

forming said outermost farinaceous layer using a pair of opposing farinaceous slices defining a pair of major outermost surfaces, one of which is associated with each opposing farinaceous slice, and each major outermost surface receiving said coating and such that each one of the opposing farinaceous slices defines an innermost surface opposite each major outermost surface;

prior to said coating step, arranging a filling between the innermost surfaces of the opposing pair of farinaceous slices; and sealing a peripheral edge portion of the innermost surfaces of the opposing farinaceous slices to one another in a way that is intended to prevent the filling from escaping from between the opposing farinaceous slices.

14. The method of claim 13 wherein said sealing step includes the steps of (i) applying a sealing bead of farinaceous paste to the innermost surface of a first one of the opposing farinaceous slices surrounding said filling, (ii) positioning the innermost surface of the second one of the farinaceous slices against the innermost surface of the first farinaceous slice along with the farinaceous paste disposed thereon to spread the farinaceous paste across said peripheral edge portion, and (iii) cooking the food product in a predetermined way which bonds the first and second slices to one another with the sealing paste.

15. The method of claim 14 further comprising the step of formulating said farinaceous paste using a mixture of approximately 46% flour and 54% water by weight upon application to the opposing farinaceous slices.

16. The method of claim 14 wherein the sealing bead includes a weight of approximately 8 grams upon application.

17. The method of claim 1 wherein said additional solids include particles formed from a farinaceous mixture that is used to form said outermost farinaceous layer.

18. The method of claim 17 further including the step, of prior to dispersing the particles in the high solid fat index lipid mixture, treating said particles in a way that is intended to maintain a desired appearance of the coated portions of the outermost surfaces when the food product is reheated in a toasting environment.

19. The method of claim 1 wherein the food product includes a product outline and further comprising the step of:

forming a peripheral edge portion of said outermost farinaceous layer in way that is intended to limit burning of the peripheral edge portions of the food product while reheating in a toasting environment.

20. The method of claim 1 further including the step, of formulating said coating in a way that is intended to maintain a desired appearance when the food product is reheated in a toasting environment.

21. The method of claim 17 further including the step, of preparing said particles in a way that is intended to maintain a desired appearance when the food product is reheated. outermost farinaceous major layers are also formed.

22. The method of claim 1 wherein said high solid fat index lipid mixture is formulated with at least 60 percent of said hard butter by weight.

23. The method of claim 22 wherein said hard butter is provided in a range from 60 percent to 80 percent by weight.

24. The method of claim 1 including the step of reheating the reheatable product in a toasting environment to cause the high solid fat index layer to transfer heat into the interior of the food product by melting and resolidifying in a way which limits toasting of the outermost surfaces while absorbing into the product.

* * * * *